No. 737,702. PATENTED SEPT. 1, 1903.
E. B. CALDWELL.
TIRE.
APPLICATION FILED MAR. 14, 1902.
NO MODEL.
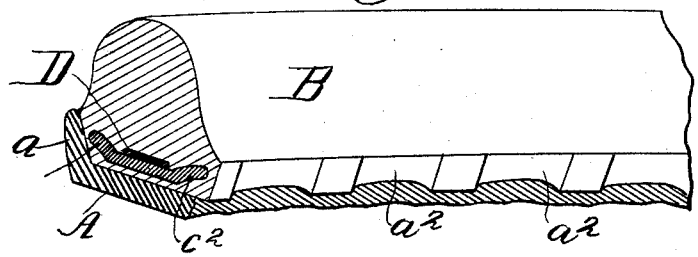
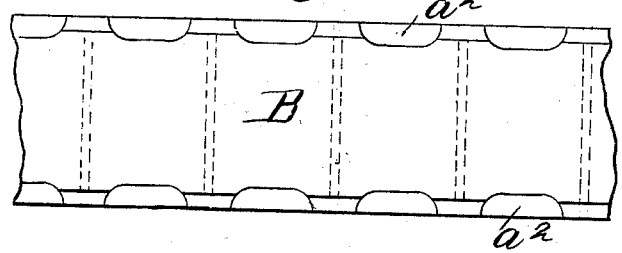
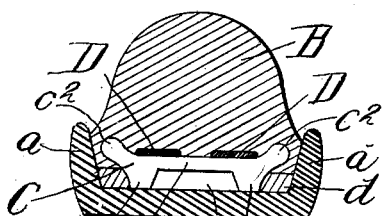
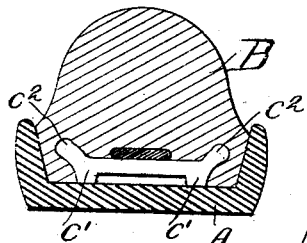
Witnesses
Ralph Jonas
Geo. R. Kerr
Edwin B. Cadwell
Inventor
Attorney C. W. Edwards No. 737,702. Patented September 1, 1903.

UNITED STATES PATENT OFFICE.

EDWIN B. CADWELL, OF NEW YORK, N. Y.

TIRE.

SPECIFICATION forming part of Letters Patent No. 737,702, dated September 1, 1903.

Application filed March 14, 1902. Serial No. 98,162. (No model.)

*To all whom it may concern:*

Be it known that I, EDWIN B. CADWELL, a citizen of the United States, residing at New York city, in the county of Kings and State of New York, have invented certain new and useful Improvements in Tires, of which the following is a full, clear, and exact specification.

My invention relates to tires for the wheels of vehicles, and more particularly to the class of tires whereof the tread is made of some yielding material, such as rubber, and in which the tread is held by suitable means within the channel or between the flanges of a channel-piece or rim.

The objects of my invention are to provide means for holding the tread within the channel-piece of a character which will not in use cut through the material of the tread, to provide a strong, durable, and compact structure which will undergo any kind of strain and wear, and to produce a tire the tread of which is not liable to buckle or turn within the channel or over the flanges of the channel-piece.

With these objects in view my invention consists in the elements, features, and combinations of parts hereinafter described, and pointed out in the claims.

In the accompanying drawings, forming part of this specification, Figure 1 is a perspective view of a section of a tire containing features of my invention, this view also showing one of the flanges of the channel-piece broken away. Fig. 2 is a plan view of the tire-section shown in Fig. 1. Figs. 3 and 4 are vertical cross-sectional views of the tire, showing different forms of my invention; and Fig. 5 is a detail bottom view of Fig. 4.

It is not essential to an understanding of this invention to show any of the details of the wheel to which the tire is to be applied, it being understood that the channel-piece can be secured in place in any suitable manner without affecting the scope of my invention.

A indicates the channel-piece, having the oppositely-flared flanges $a\ a$, forming between them the channel $a'$. This channel-piece is usually made of metal, but of course can be made of any material found suitable for the purpose.

B indicates the tread, which is given any suitable peripheral conformation, but which at its base is given a conformation corresponding to the shape of the channel of the channel-piece. This tread may be made of a single piece of rubber or of several pieces, as shown in Fig. 2, in the manner and as set forth in my application of even date herewith, Serial No. 98,161.

C indicates generally the "bridge-piece," a term which I have selected for the means or device which sustains the wear, strain, and weight of the retaining means or wires and prevents the latter from cutting and injuring the tread. This bridge consists of a body portion or stretch $c$, having upwardly-turned ends $c^2\ c^2$, the body portion serving as a rest or holding medium for the retaining means. In Figs. 3 and 4 the bridge is cut out at the bottom, providing an arch and separated legs $c'$, upon which the bridge is sustained in the channel. The ends $c^2\ c^2$ are inclined upwardly and outwardly and extend nearly to the edges or flanges of the channel-piece. In Fig. 1 the bridge-piece is devoid of sustaining means additional to the body portion, the latter being made to perform the function of the legs or depending portion of the other forms. In the form of Fig. 1 the ends are caused to flare as in Figs. 3 and 4, and the retaining means are held as in Figs. 3 and 4.

D indicates the retaining means, in this instance being shown as broad flat metal bands or wires, one or more, the same being drawn through apertures in the base of the tread and having their ends fastened or secured together in any suitable and well-known manner. If a plurality of wires are used, they will be arranged side by side.

An important feature of my invention resides in grouping the retaining means or wires and the holding means or bridges at or near the base of the tread portion of the tire and within the channel and below the top of the flanges of the channel-piece, and this irrespective of the form or structure of either the retaining or the holding means. When thus grouped, a solid and compact base is given the tread, which enables it to be held firmly in the channel-piece, and with the projecting ends provided on the bridge the tread at its base is caused when the retaining means are tightly drawn to be firmly bound and held in the channel and against the flanges of the channel-piece.

The bridge-pieces may be of any suitable size and height and provide a means for regulating the distance of the retaining-bands from the bottom of the channel in the channel-piece and limit the compressibility of the tread and the distance to which the said bands can be drawn into said channel. Hence these bridge-pieces, which are disposed in any desired number within, transversely, and circumferentially of the tread, directly support the retaining-bands and relieve the base of the tread of an objectionable and injurious strain. By making the retaining-bands flat and broad they are less liable to cut or injure the material of the tread.

As shown in Figs. 1 and 2, the base of the tread is preferably provided with pockets $a^2$, so that when the base of the tread is compressed within the channel the material thereof will bulge and fit snugly and tightly against the flanges of the channel-piece and prevent buckling and longitudinal displacement.

The manner of disposing the bridges is by forming in the tread at the base at intervals transverse vertical slits into which the bridges are entered or set in any suitable manner, and if the tread is composed of two parts or kinds of material, as shown in Fig. 3, the filling-piece or base $d$ is provided with similar slits, the bridges set therein, and the two parts vulcanized together in molds. In lieu of forming slots in the tire the bridge-pieces may be pressed into the soft rubber before the tire is vulcanized. In all cases, however, irrespective of whether the bridge-piece is pressed into the rubber or is inserted in a slot the upwardly-extending ends extend well into the body of the tire, leaving the body portion $c$ near the base of the tire. Thus the bridge-piece as a whole need not be embedded very deeply in the tire. This mode of forming the tire causes the rubber to surge about the bridges and firmly and compactly embed them in the body of the tread. Furthermore, sufficient rubber will be embedded between the upwardly-projecting ends of the bridge-pieces and the flanges of the channel-piece to prevent the tire from being displaced by lateral strains. When the tire is vulcanized, the bridge-pieces are inserted in slits made in the inner periphery of the tire. In the arched space between the legs of the bridge-pieces core-pieces are inserted and remain there during vulcanization. After the tire has been vulcanized the rubber has flowed around the bridge-pieces and has obliterated the slits. The core-pieces are withdrawn, leaving chambers corresponding in configuration to the arched space under the bridge-pieces, into which the tire can expand when under compression.

I have thus produced a tire for all kinds of vehicles, and one which is strong, compact, and durable and which contains none of the objectionable features present in tires now known or in use.

Having thus described my invention, what I claim, and desire to secure by Letters Patent, is—

1. In a tire, the combination of a tire comprising a base portion of low compressibility and a tread portion of high compressibility, a plurality of flat sustaining-bridges transversely embedded in, and having legs projecting downwardly into said base portion, and upwardly-turned ends projecting into said tread portion, and retaining means resting on and sustained by said sustaining-bridges, substantially as described.

2. In a tire, the combination of a tire comprising a base portion of low compressibility and a tread portion of high compressibility, a plurality of flat sustaining-bridges transversely embedded in, and having legs projecting downwardly into said base portion, and upwardly-turned ends projecting into said tread portion, retaining means resting on and sustained by said sustaining-bridges, and a plurality of pockets or depressions at the edges of said base portion adapted to permit the adjacent parts of said base portion to flow therein when the tire is under pressure, substantially as described.

3. In a tire, the combination with the channel-piece and tread, of a plurality of transversely-arranged bridge-pieces embedded in the tread, having upwardly-turned ends extending outward toward the flanges of the channel-piece, and downwardly-extending spaced legs, and a retaining-band, substantially as described.

4. In a tire, the combination with a channel-piece, of a tire having transverse slots, retaining means within said tire and bridge-pieces embedded in the tire for sustaining said retaining means, each comprising a body portion having spaced legs, and upwardly-flaring ends extending outwardly beyond the retaining means for holding the retaining means on the body portion of the bridge-piece, substantially as described.

5. In a tire, the combination with the channel-piece, of a tread having a plurality of radial pockets or depressions at its edges, the said depressions being normally unfilled, whereby the parts of the tread adjacent to said depressions are permitted to expand longitudinally into the same, substantially as described.

In testimony whereof I affix my signature in presence of two witnesses.

EDWIN B. CADWELL.

Witnesses:
C. V. EDWARDS,
RALPH JONAS.